Patented May 31, 1932

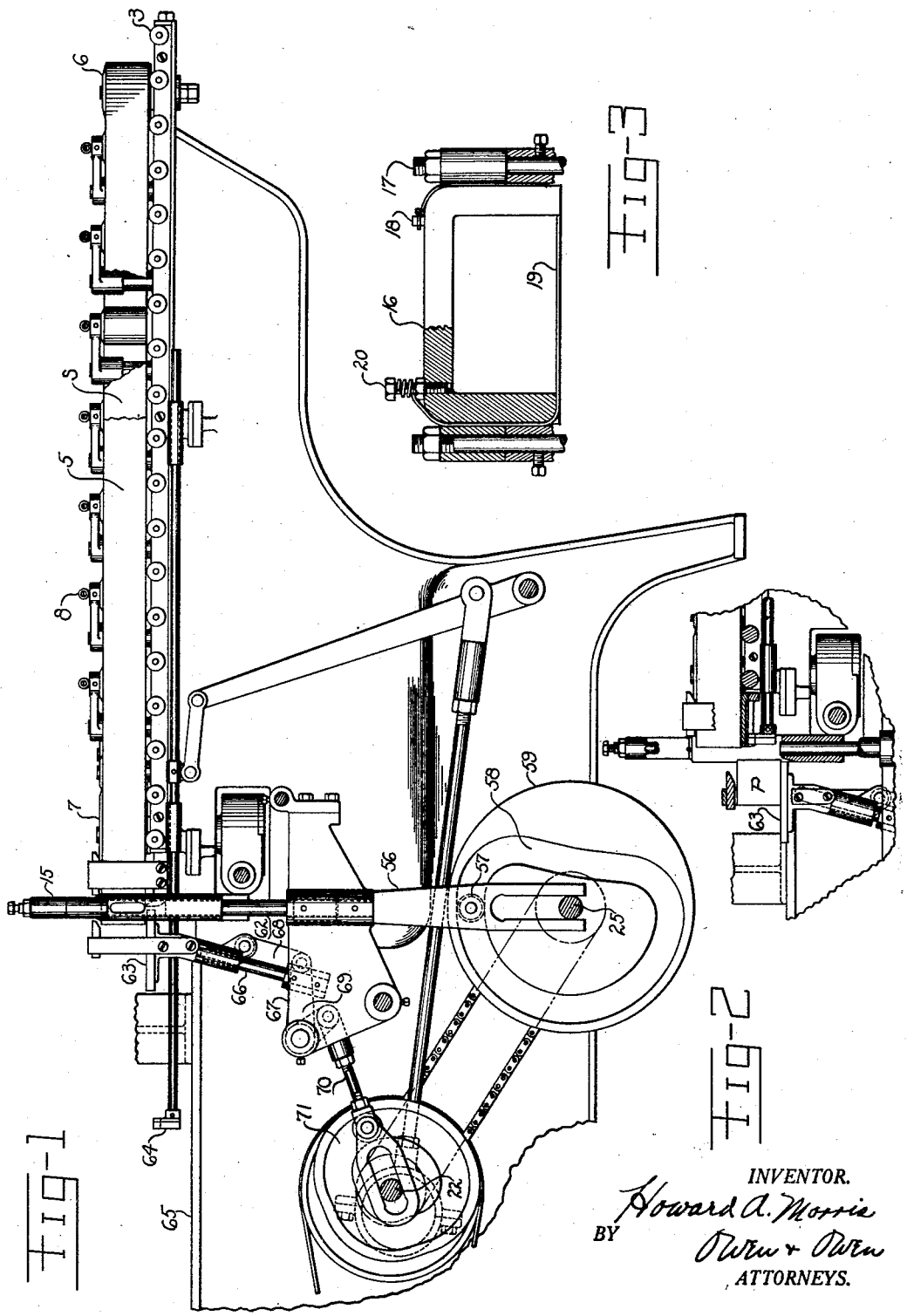

1,861,160

UNITED STATES PATENT OFFICE

HOWARD A. MORRIS, OF TOLEDO, OHIO, ASSIGNOR TO THE AUTOMAT MOLDING & FOLDING COMPANY, OF TOLEDO, OHIO, A CORPORATION OF OHIO

MACHINE FOR HANDLING BUTTER PRINTS

Original application filed July 8, 1930, Serial No. 466,394. Divided and this application filed September 18, 1931. Serial No. 563,602.

This invention relates to machines for wrapping bars of butter, oleomargarine, or like plastic or semi-plastic material, but more particularly to mechanism for conveying the bars directly after they have been severed from the slab to a point from which the individual bars are advanced to the wrapping mechanism.

An object of the invention is to produce a conveying device for shifting or conveying the bars from one place to another in such manner that liability of the bars adhering to the unsevered mass or slab is eliminated.

Other objects and advantages of the invention will hereinafter appear, and for purposes of illustration, but not of limitation, the invention is shown on the accompanying drawings, in which:

Figure 1 is a side elevation partly in section of a feeding mechanism for an article wrapping machine showing particularly the feeding mechanism, the bar elevator or conveyor, the advancing ram and associated driving mechanism;

Figure 2 is a side elevation partly in section of the elevator and associated parts showing the elevator in its lowered position with a severed bar or print in position to be engaged by the ram for further advancing movement;

Figure 3 is an end elevation partly in section of the cutting head; and

Figure 4:
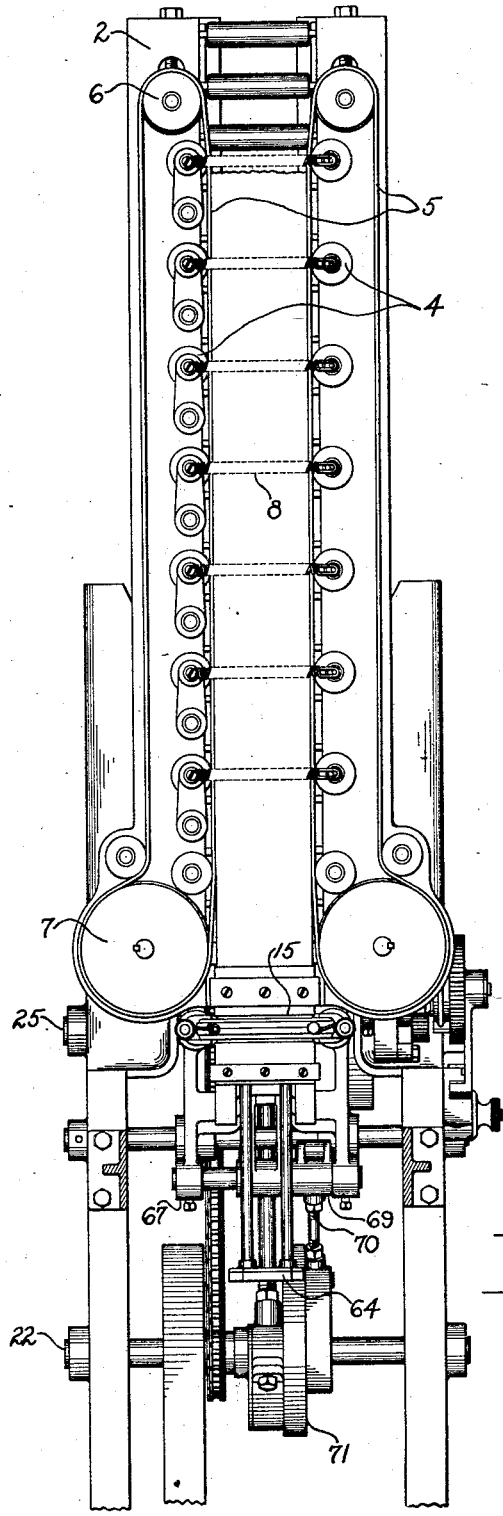
Figure 4 is a top plan view of the article feeding mechanism and associated parts.

This application constitutes a division of my co-pending application Serial No. 466,394, filed July 8th, 1930, and entitled "Article feeding mechanism".

The illustrated embodiment of the invention comprises a table 2 having a series of laterally spaced rollers 3 over which a slab S of butter, oleomargarine, or other material of similar plastic or semi-plastic nature, is advanced. Opposite sides of the slab S are engaged by parallel runs 4 of endless belts 5 which extend longitudinally of the table 2, and are disposed on opposite sides thereof. Spring tensioning devices 8 are utilized for holding the runs 4 of the belt 5 in engagement with opposite sides of the slab S. One end of each belt 5 is trained around a pulley 6, and the opposite end is trained around a power driven sheave 7.

The movement is intermittently imparted to the driving sheaves 7 in order to feed the slab S intermittently or step-by-step along the table 2. Since the mechanism or driving sheaves form no part of the present invention detailed description thereof is not considered necessary.

At the forward end of the table 2 is a cutting device 15 for severing from the slab S prints or bars. As shown in Fig. 3, the severing device comprises an inverted U-shaped frame 16, which is mounted on vertical rods 17. Attached at one end to a post 18 is a cutting wire 19, which extends across the arms of the frame, and has one end wound about a screw threaded bolt 20, which is secured to the frame 16.

The cutting device 15 is vertically reciprocated by a yoke 56, which straddles a transverse driven shaft 25. A roller 57 on the yoke 56 rides in a cam groove 58 formed in a wheel 59 rotatable with the shaft 25. The yoke 56 is suitably connected to the cutting unit 15 to impart vertical reciprocatory movements thereto, the cutting head being guided in its vertical movements by guide rods 62. The cutting device 15 is timed to operate at the period when the conveyor belts 5 are at rest. Thus a predetermined quantity of material is advanced by the feeding device, and then the feeding device is rendered inoperative, whereupon the cutting device operates to sever the material so advanced from the slab.

The prints or bars P severed from the slab S are supported on an elevator 63, which moves downwardly into a position where a ram 64 engages each bar and advances the same from the elevator along a table 65 to the wrapping mechanism (not shown). Depending from the elevator 63 and inclined forwardly therefrom is a rod 66, the movement of which is guided by a sleeve 67 secured to the machine frame. Movement is imparted to the elevator 63 by a link 68, which is pivoted to one arm of a bell crank 69, the opposite arm of which is connected to a rod 70 deriving its motion from a cam 71 rotatable with a transverse shaft 22.

A cardinal feature of this invention resides in the removal or separation of the severed print or bar P from the slab S in such a manner that the bar will not stick or adhere to the unsevered mass during its removal. Difficulty has heretofore been experienced in separating or removing the severed print from the slab where the print is moved at right angles to the slab. This has materially interfered with the efficient operation of the machine, and has for sometime been a source of annoyance to users of machines of the above type. This invention obviates the difficulties heretofore encountered for moving the severed print from the slab at an angle so that liability of the print sticking to the unsevered mass is eliminated as a practical matter.

It is to be understood that the above description is given by way of illustration, and not of limitation, and numerous details of construction and operation may be effected without departing from the spirit of the invention as defined in the following claims.

What I claim as new and desire to secure by Letters Patent is:

1. In a machine of the class described, a feeder for advancing a slab of butter or the like, a device operable intermittently to sever a predetermined amount from said slab, an elevator to receive the severed quantity, and lever means operable to shift said elevator away from said feeder at an angle less than a right angle to the plane of severance in a substantially vertical direction to prevent the severed quantity from adhering to the remainder.

2. In a machine of the class described, means for feeding a slab of butter or like material, means to sever a predetermined amount from said slab, means for receiving the severed amount, and means for moving the receiving means away from the feeding means at an angle less than a right angle to the plane of severance and in a substantially vertical direction whereby to prevent the severed quantity from adhering to the remainder.

3. In a machine of the class described, means for feeding a slab of butter or like material, means to sever a predetermined amount from said slab, means for receiving the severed amount, and means for moving the receiving means away from the feeding means at an angle less than a right angle to the plane of severance and in a substantially vertical direction whereby to prevent the severed quantity from adhering to the remainder, said last means comprising a reciprocable rod connected to said receiving means and inclined downwardly and forwardly therefrom, means to guide the movement of said rod, and means engaging said rod for imparting reciprocating movement thereto.

In testimony whereof I have hereunto signed my name to this specification.

HOWARD A. MORRIS.